(12) United States Patent
Mirzaei et al.

(10) Patent No.: US 12,535,052 B2
(45) Date of Patent: Jan. 27, 2026

(54) WIND FARM WAKE CONTROL ACTIVATION METHOD

(71) Applicant: VESTAS WIND SYSTEMS A/S, Aarhus N. (DK)

(72) Inventors: Mahmood Mirzaei, Skovlunde (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 484 days.

(21) Appl. No.: 17/919,479

(22) PCT Filed: Apr. 16, 2021

(86) PCT No.: PCT/DK2021/050113
§ 371 (c)(1),
(2) Date: Oct. 17, 2022

(87) PCT Pub. No.: WO2021/209112
PCT Pub. Date: Oct. 21, 2021

(65) Prior Publication Data
US 2023/0175481 A1 Jun. 8, 2023

(30) Foreign Application Priority Data
Apr. 16, 2020 (DK) .......................... PA 2020 70236

(51) Int. Cl.
*F03D 7/02* (2006.01)
*F03D 7/04* (2006.01)

(52) U.S. Cl.
CPC .......... *F03D 7/0204* (2013.01); *F03D 7/048* (2013.01); *F05B 2270/204* (2020.08);
(Continued)

(58) Field of Classification Search
CPC ......... F03D 7/0204; F03D 7/048; Y02E 10/72
See application file for complete search history.

(56) References Cited

U.S. PATENT DOCUMENTS

2013/0166082 A1* 6/2013 Ambekar ............. G05B 13/041
700/287
2014/0234103 A1* 8/2014 Obrecht .................. F03D 7/048
416/9

FOREIGN PATENT DOCUMENTS

EP 2767710 A2 8/2014
EP 3037657 A1 6/2016
(Continued)

OTHER PUBLICATIONS

Danish Patent and Trademark Office, 1st Technical Examination including The Search Report and Search Opinion for Application PA 2020 70236 dated Sep. 23, 2020.
(Continued)

*Primary Examiner* — Mark A Connolly
(74) *Attorney, Agent, or Firm* — Patterson + Sheridan, LLP; Gero G. McClellan (57) ABSTRACT

The invention relates to a method for controlling a yaw offset of a plurality of wind turbines. The method uses a decision function which generates an activation parameter for determining if the yaw offset control of a specific wind turbine should be enabled or disabled. The decision function depends on two or more variables comprising a wind direction variable indicative of the wind direction of the specific wind turbine, and a wind variation variable defining at least a wind variation range where yaw offset control is disabled or enabled. Based on the decision function it is determined if a yaw offset should be added to the current yaw setting of the specific wind turbine.

17 Claims, 3 Drawing Sheets

(52) U.S. Cl.
CPC ... *F05B 2270/309* (2013.01); *F05B 2270/321* (2013.01); *F05B 2270/708* (2013.01)

(56) References Cited

FOREIGN PATENT DOCUMENTS

| | | |
|---|---|---|
| EP | 3412909 A1 | 12/2018 |
| EP | 3517774 A1 | 7/2019 |
| EP | 3620649 A1 | 3/2020 |
| WO | 2021209112 A1 | 10/2021 |

OTHER PUBLICATIONS

PCT, International Search Report for Application PCT/DK2021/050113 dated Jul. 16, 2021.
PCT, Written Opinion of The International Searching Authority for Application PCT/DK2021/050113 dated Jul. 16, 2021.

* cited by examiner

| wind speed | wind direction Wx | | | |
|---|---|---|---|---|
| | 0-10 | 10-20 | 20-35 | 35-50 |
| 0-10 | θ=20° | 15° | 10° | 0° |
| 10-20 | 20° | 15° | 10° | 0° |
| 20-30 | 20° | 15° | 10° | 0° |
| 30-40 | 20° | 15° | 10° | 0° |

WIND FARM WAKE CONTROL ACTIVATION METHOD

FIELD OF THE INVENTION

The invention relates to control of wind farms comprising a plurality of wind turbines, particularly to methods for handling wake effects.

BACKGROUND OF THE INVENTION

Wake losses in a wind farm may cause power production losses.

EP 2 063 108 A2 discloses a method for increasing the power production of a wind park during conditions when the wake created by an upstream turbine effects the power production of a downstream turbine. Minimizing the wake effects created by an upstream turbine on a downstream turbine increases the net power produced by both the upstream and downstream turbines. Also disclosed is an implementation of an algorithm to determine the controller settings of one or more upstream turbines to increase total energy capture of the turbines in the wind park. The algorithm also reduces the fatigue loads on the downstream turbines by reducing the turbulence created by the wake effects of the upstream turbine.

There is still a need for improving the capability of wake control methods to reliably improve the compensation of wake losses.

SUMMARY OF THE INVENTION

It is an object of the invention to provide improved methods for limiting power production losses due to wake effects.

In a first aspect of the invention there is provided a method for controlling a yaw offset of a plurality of wind turbines, wherein the method comprises
  providing a decision function arranged for providing an activation parameter for a specific wind turbine of the plurality of wind turbines dependent on two or more variables, where the two or more variables comprise:
    a wind direction variable indicative of the wind direction of the specific wind turbine, and
    a wind variation variable defining at least a wind variation range where yaw offset control is disabled and/or a wind variation range where yaw offset control is enabled, and
  enabling or disabling the yaw offset control of the specific wind turbine based on the activation parameter, wherein the enabled yaw offset control provides a yaw offset relative to a default yaw setting.

Advantageously, the decision function determines which of the wind turbines should have the yaw offset control enabled or disabled. Since the decision is based on the wind variation range, there is a higher likelihood that a given energy production is obtainable as long as the actual wind variations are within the wind variation range. That is, since there is a given likelihood that certain wind conditions such as wind directions will be within the wind variation range, there is a corresponding (high) likelihood that a given energy production is obtainable as long as the wind condition is within the wind variation range.

Accordingly, the method may increase the likelihood that the control action actually improves production and does not worsen the power production in an attempt to partially compensate wake induce power production losses.

The decision function provides information, e.g. via the activation parameter, that enables determination of whether the yaw offset control of the specific wind turbine should be enabled or disabled based on the variables of the function.

The wind direction variable indicates the direction of the wind in the vicinity of the specific wind turbine. The wind direction could be a mean value of the wind direction measured within a given time window such as the mean absolute wind direction.

The wind variation variable could define a range of the variable where the offset control is disabled, such as a range of wind directions where the offset control is disabled irrespective of the values of the other variables. Additionally, the wind variation variable defines ranges of the variable where the offset control will be disabled or enabled dependent on the other variables of the decision function.

The wind variation variable may be determined as a standard deviation of the wind variable such as the standard deviation of the wind direction or the wind turbulence. Thus, the wind variation range can be defined as a level of the standard deviation.

The yaw offset control provides an offset yaw angle to the default yaw setting, i.e. the yaw setting normally applied to maximize the wind intake of the rotor plane.

According to an embodiment, the wind variation variable comprises one or both of: a wind direction variation variable indicative of a level of variation of a wind direction over time, and a wind turbulence variation variable indicative of a level of variation of a wind turbulence.

Advantageously, by determining the activation parameter dependent on the level of variation of the wind direction, the activation of the yaw offset control may only be invoked if the variation in the wind direction is sufficiently low to make it more likely that introduction of the yaw offset control improves the power production.

According to an embodiment, the activation parameter provides information defining if the yaw offset control should be disabled and/or enabled.

According to an embodiment, the decision function has been determined based on comparing a simulated energy production of the plurality of wind turbines when the yaw offset control is enabled, respectively disabled, for one or more of the plurality of wind turbines.

According to an embodiment, the decision function has been determined and/or is updated based on a comparison of an actual energy production of the plurality of wind turbines obtained when the yaw offset control is enabled respectively disabled for one or more of the plurality of wind turbines.

Advantageously, the decision function is updated based on actual data so that the decision to enable or disable yaw offset control is based on experience and therefore more accurate with respect to the obtained energy production.

According to an embodiment, the yaw offset is scaled according to a weight provided by the decision function or by the activation parameter.

Advantageously, instead of simply enabling or disabling the yaw offset, the level of the yaw offset may be scaled dependent on the values of the variables of the decision function.

According to an embodiment, the variables of the decision function further comprises: a wind shear variable, a nacelle direction variable for the specific wind turbine, a nacelle direction variable for a neighbor wind turbine to the specific wind turbine, and a wind turbulence variable for a neighbor wind turbine to the specific wind turbine.

According to an embodiment, the method comprises providing a plurality of decision functions arranged for providing a plurality activation parameters for a plurality of specific wind turbines dependent on the two or more variables.

Advantageously, a decision function is provided for each wind turbine.

A second aspect of the invention relates to a wind turbine controller unit arranged for controlling a yaw offset of one or more wind turbines, the wind turbine controller unit comprises a decision function arranged for providing an activation parameter for a specific wind turbine of the plurality of wind turbine dependent on two or more variables, where the two or more variables comprise:
  a wind direction variable indicative of the wind direction of the specific wind turbine, and
  a wind variation variable defining at least a wind variation range where yaw offset control is disabled and/or a wind variation range where yaw offset control is enabled,
wherein the activation parameter is provided for enabling or disabling the yaw offset control of the specific wind turbine, where the enabled yaw offset control provides a yaw offset relative to a default yaw setting.

A third aspect of the invention relates to a computer program product comprising software code adapted to control a wind turbine when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 36 shows a possible way to implement a decision function of the yaw controller based on curves in a 3D space spanned by three variables of the decision function.

DESCRIPTION OF EMBODIMENTS

Figure 1A:
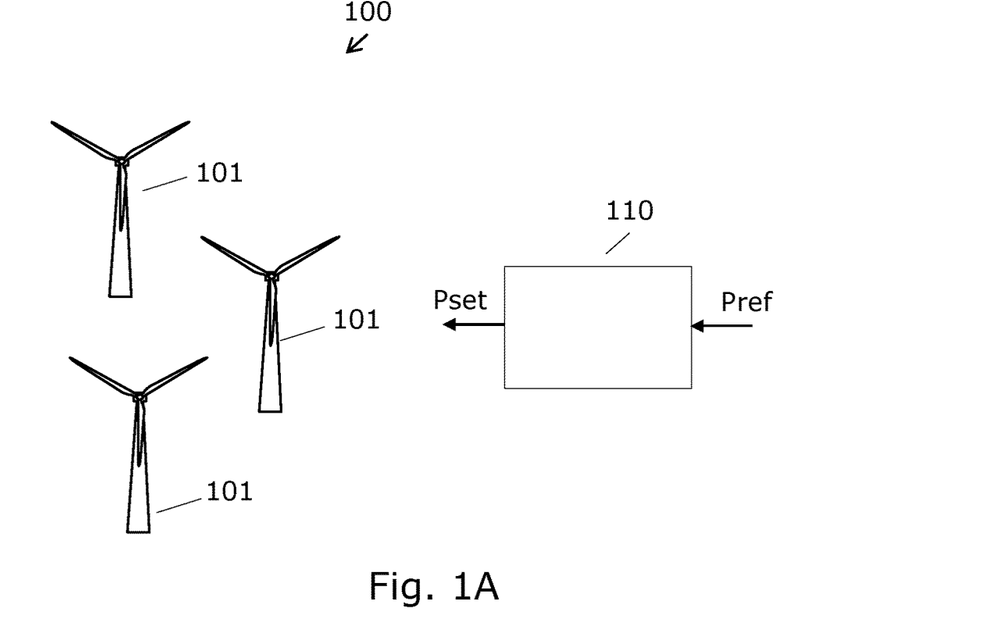
FIG. 1A shows a wind farm comprising a plurality of wind turbines and a wind farm controller.

FIG. 1A shows a wind farm 100 which comprises a plurality of wind turbines 101.

The wind farm is connectable with an electrical power grid (not shown) for supplying power generated by the wind turbines 101 to the electrical power grid.

In the illustrated example, the wind turbines of the wind farm 100 is controlled by a central wind farm controller 110. The wind farm controller 110 is arranged to control power generation from the wind turbines 101 according to a wind farm reference Pref which defines the desired power to be supplied to the grid from the wind farm 100. Furthermore, the central controller is arranged to dispatch power set-points Pset to the wind turbines, i.e. individual power set-points to each wind turbine 101 which set the desired power productions of individual wind turbines. The power set-points Pset may be determined by the wind farm controller 110 dependent on the wind farm reference Pref so that the sum of power set-points Pset corresponds to the wind farm reference Pref.

The wind turbine 101 comprises a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The wind turbine may further include a power converter for converting the generator AC power into a DC power and a power inverter for converting the DC power into an AC power to be injected into the electrical power grid.

The generator of the wind turbine 101 is controllable to produce power corresponding to the power set-point Pset provided by the wind farm controller 110. For wind turbines, the output power may be adjusted according to the power set-point by adjusting the pitch of the rotor blades or by controlling the power converter to adjust the power production.

Figure 1B:
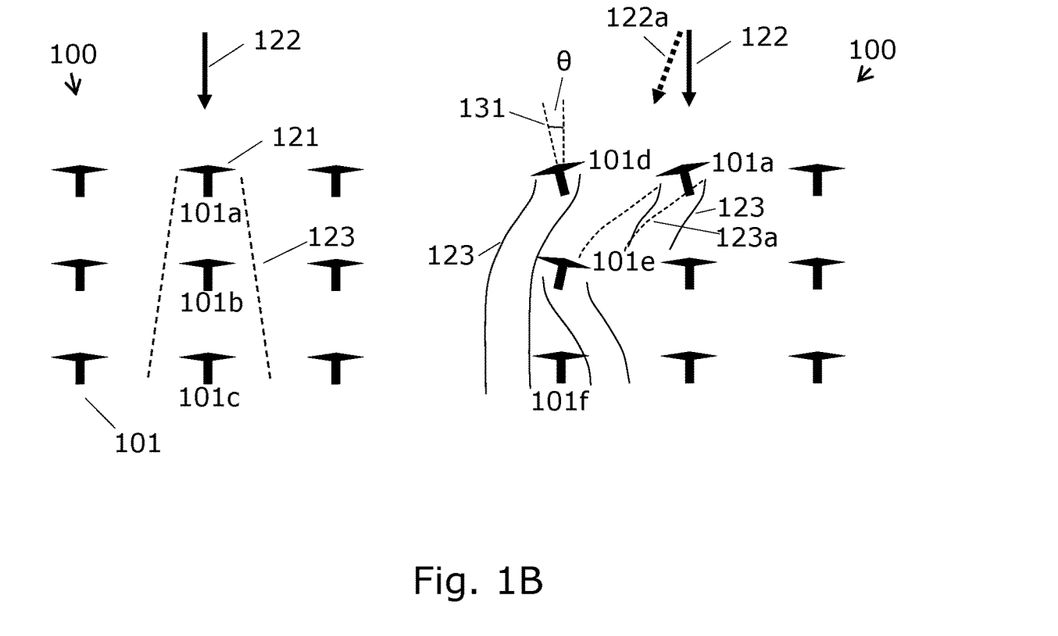
FIG. 1B shows relative locations of wind turbines in a wind farm.

FIG. 1B shows relative locations of wind turbines 101 in a principal sketch of a wind farm 100 seen from above. In the configuration of the wind farm 100 shown to the left, the rotor plane 121 of all wind turbines are perpendicular to the wind direction 122 in order to maximize the wind power intake. However, the rotor of the upstream wind turbine 101a generates a wake in the form of a wind field 123 with reduced wind speed which affects the downstream wind turbines 101b and 101c. This reduction of the wind speed in the shadow of the upstream wind turbine is known as the wake effect.

In the configuration of the wind farm 100 shown to the right, the rotor plane 121 of the upstream wind turbine 101d has been rotated, i.e. yawed out of the wind, so that the rotor plane normal deviates from the wind direction 122 by a certain angle θ which depends on or corresponds to the nacelle direction 131.

The orientation of the nacelle or equivalently the rotor plane normal relative to a fixed direction such as the geographical north is referred to as the nacelle direction 131 which is indicative of the yaw angle of a specific wind turbine 101.

Due to the rotation of the rotor plane 121 of the upstream wind turbine 101d out of the wind, the wind field 123 downstream to the wind turbine is directed away from the wind direction. Thus, by providing yaw offset control to the wind turbines 101, the downstream wind field 123 may be directed according to a yaw offset θ up an upstream wind turbine so that the downstream wind turbines 101e, 101f are less affected by the wake effect. The angle of the direction of the downstream wind field 123 depends obviously on the wind direction 122, but also on the wind speed, wind shear (i.e. distribution of different wind speeds over the rotor plane), wind turbulence as well as other wind characteristics.

Thus, in this ideal situation with a fixed wind direction 122 and a fixed wind speed it may be possible to determine the nacelle direction 131 of all wind turbines 101 so that the wake compensation is optimized for the wind farm 100.

Therefore, with predictable wind conditions including predictable wind speeds and wind directions and with known nacelle directions 131, it may be possible to determine yaw offset angles θ for each turbine which optimizes the power production, at least with respect to the wake effects.

However, such wind conditions are only predictable with a certain probability and, therefore, wake control of the wind farm 100 performed in order to optimize power production risk being unsuccessful when the statistical variations of the wind parameters are not taken into account.

For example, with the wind direction 122, the redirected wind field 123 of the upstream wind turbine 101*a* may pass through the rows of the downstream wind turbines 101. However, if the wind direction changes from direction 122 to wind direction 122*a*, the redirected wind field 123 may change into another redirected wind field 123*a* which may impact one of the downstream wind turbines 101*e* with reduced wind speed and possibly wind turbulence. This shows that in one wind condition, the yaw offset control, i.e. the wake control, may provide a power production optimized wake compensation, but in another likely wind condition, the yaw offset control may even worsen the power production as compared to a situation where no yaw offset control is performed.

The yaw offset θ may be defined as a deviation of the nacelle direction 131 due to the yaw offset compared to the normal, not wake compensated, nacelle direction 131, e.g. where the rotor plane 121 is perpendicular to the wind direction 122.

Figure 2A:
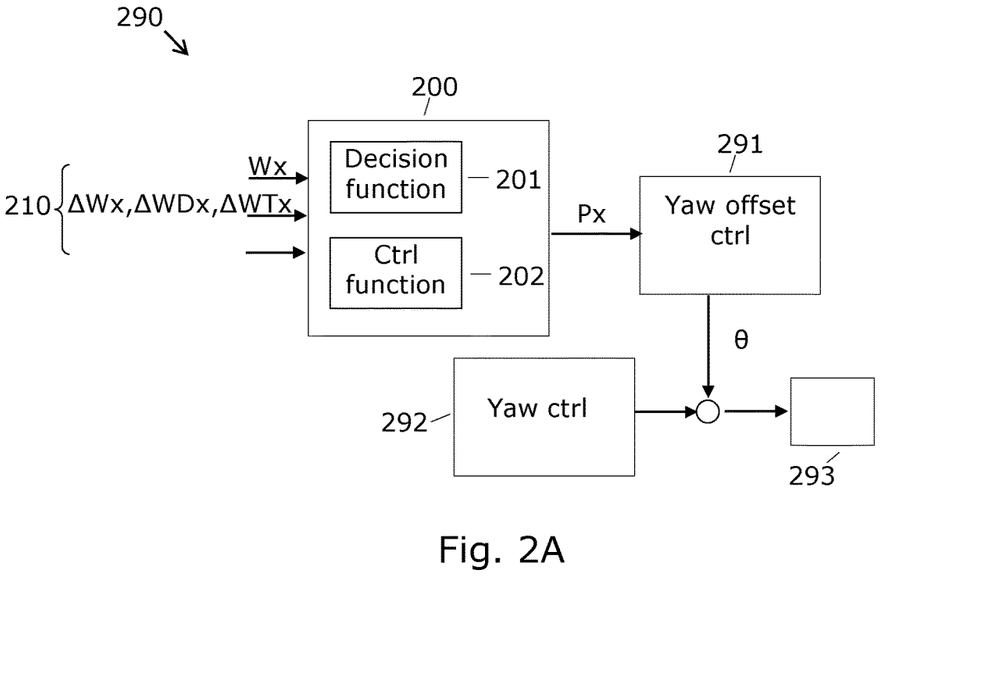
FIG. 2A shows a yaw control system arranged for controlling the yaw angle of a wind turbine.

FIG. 2A shows a wind turbine controller such as a yaw control system 290 arranged for controlling the yaw angle of a wind turbine 101. The yaw control system 290 comprises a yaw offset controller 291 arranged to provide the yaw offset control in terms of a yaw offset angle θ, and a yaw controller 292 arranged to control a yaw mechanism 293 according to a desired nacelle direction 131, e.g. the optimal nacelle direction 131 which ensures that the rotor plane is perpendicular to the wind direction 122, The optimal nacelle direction 131 is obtained by the default yaw setting provided by the yaw controller 292.

The yaw offset controller 291 is configured to be enabled to provide a yaw offset θ or disabled, i.e. to not provide a yaw offset θ, or to provide a zero yaw offset θ dependent on the activation parameter Px, e.g. a binary parameter Px provided by a binary activation signal. Thus, the activation parameter Px provides information defining if the yaw offset controller 291 should generate yaw offset control or not.

In case the yaw offset controller 291 is enabled, the yaw offset θ is determined and added to the output of the yaw controller 292 so that the default yaw setting is modified by the yaw offset θ.

Alternatively, instead of a separate yaw offset controller 291, the yaw offset controller 291 may be combined with the yaw controller 292 so that the yaw offset θ could be combined with other control signals of the yaw controller than the output control signal.

FIG. 2A further shows a wind turbine controller unit 200 arranged for controlling a yaw offset θ of one or more wind turbines 101. The wind turbine controller unit 200 comprises a decision function 201 arranged for providing an activation parameter Px for a specific wind turbine 101*a* of the plurality of wind turbines 101 dependent on two or more variables 210.

The variables 210 includes a wind direction variable Wx indicative of the wind direction of the specific wind turbine. The wind direction variable may be based on the wind direction 122 obtained from a central wind sensor such as a met mast, from decentral wind sensors such as wind sensors of individual wind turbines 101, estimated wind directions, etc.

The variables 210 further includes a wind variation variable ΔWx which defines or relates to at least a wind variation range where the yaw offset control is disabled and/or a wind variation range where yaw offset control is enabled, either independent on other variables in some ranges or dependent on other variables in other ranges. The range where the yaw offset is disabled is the complement of the range where the yaw offset is enabled.

The wind variation variable may comprise a wind direction variation ΔWDx variable indicative of a level of variation of a wind direction over time.

Alternatively or additionally, the wind variation variable may comprise a wind turbulence variation variable ΔWTx indicative of the level of variation of a wind turbulence.

The wind direction variation variable ΔWDx may be determined based on wind direction measurements of individual wind turbines or via central wind direction measurements. The measurements used for determining the wind direction variation variable ΔWDx may be the most recent measurements obtained in a period of time prior to the enabling or disabling the yaw offset control. The period of time may be a predetermined period of time, e.g. the past 100 minutes prior to the enabling or disabling the yaw offset control. In this manner, it can be ensured that the yaw offset control is only enabled if the wind direction is sufficiently stable, and has been sufficiently stable in the period prior to the invoking the yaw offset control.

The wind direction variation variable ΔWDx may be determined as the standard deviation of the wind direction measurements, as a range covering the maximal and minimal wind directions obtained within a given period, as a range covering the wind directions occurring with a frequency above a given threshold, or by other methods which reflects the variations of the wind direction 122.

Similarly, the wind turbulence variation variable ΔWTx may be determined based on wind turbulence measurements of individual wind turbines or via central wind turbulence measurements. The measurements used for determining the wind turbulence variation variable ΔWTx may be the most recent measurements obtained in a period of time, in a similar manner as for the wind direction variation variable. The period of time used for the wind direction variation variable and the wind turbulence variation variable may be of the same length or of different length.

The wind turbulence variation variable ΔWDx may be determined as the standard deviation of the wind turbulence measurements, as a range covering the maximal and minimal turbulence values or such values occurring with a frequency above a given threshold, or by other methods which reflects the variations of the wind turbulence.

Other optional variables 210 that may be used for determining or providing the activation parameter includes a wind shear variable indicating a variation of wind speeds over the rotor plane 121, a nacelle direction variable for the specific wind turbine such as the nacelle direction 131, a nacelle direction variable for a neighbor wind turbine to the specific wind turbine such as nacelle directions 131 of wind turbines other than the specific wind turbine 101*a*, a wind turbulence variable indicative of the actual wind turbulence of the specific wind turbine 101*a*, a wind turbulence variable indicative of the actual wind turbulence of a neighbor wind turbine or one more other wind turbines 101 than the specific wind turbine 101a.

The activation parameter Px is provided for enabling or disabling the yaw offset control of the specific wind turbine, i.e. for enabling or disabling the generation of a yaw offset θ relative to the default yaw setting.

For example, the wind turbine controller unit 200 may comprise a control function 202 arranged to enable or disable the yaw offset control of the specific wind turbine 101a based on the activation parameter Px. Alternatively, the control function 202 may be comprised by the yaw offset controller 291 or provided otherwise to invoke the yaw offset θ.

The yaw offset θ may be scaled according to a weight, e.g. a weight between 0 and 1, provided by the decision function 201 or by the activation parameter Px. For example, the activation parameter Px may be a value between 0 and 1, where 0 disables the yaw offset control and where values above 0 and up to 1 scales the yaw offset θ determined by the yaw offset controller 201. The weight or value of the activation parameter Px is determined dependent on the variables 210.

Figure 2B:
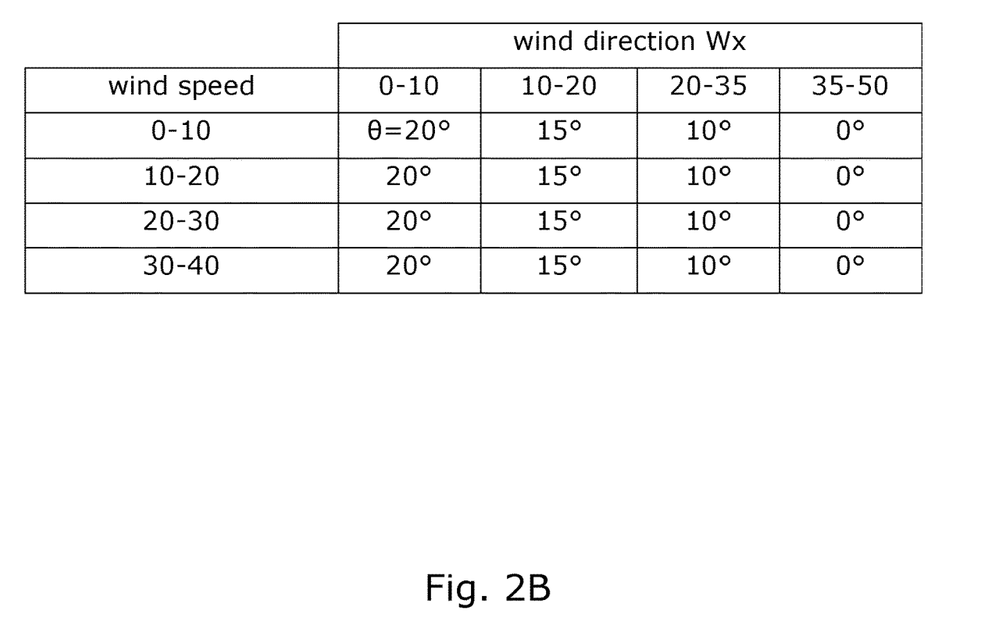
FIG. 2B shows an example of the configuration of a yaw offset controller for determining the yaw offset θ of a specific wind turbine.

FIG. 2B shows an example of the configuration of the yaw offset controller 291 where a look up table is used for determining the yaw offset θ of a specific wind turbine 101a dependent on the wind direction Wx and the wind speed for the wind turbine. E.g. for wind speeds in the 1045 m/s range, and wind directions in the intervals 0-10; 10-20; 20-30 and 30-40, the yaw offset values 0 are 20°, 15°, 10° and 0°, respectively. Accordingly, each wind turbine 101 may have its own yaw offset controller 291 configured individually with look up tables which may have been determined for each wind turbine based on wake analyses as shown in FIG. 1B.

Figure 3A:
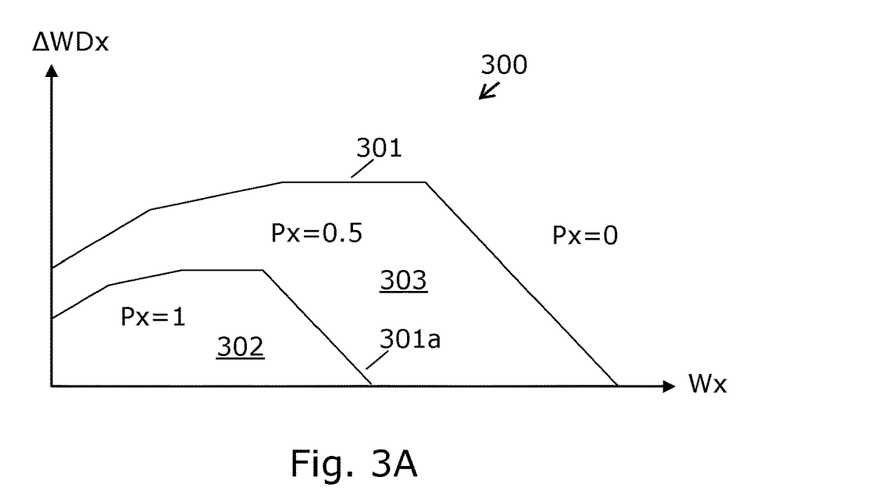
FIG. 3A shows a possible way to implement a decision function of the yaw controller based on curves in a 2D space spanned by two variables of the decision function.

FIG. 3A illustrates a possible configuration of the decision function 300 where the function, represented as a piecewise linear curve 301, is dependent on two variables 210: The wind direction variable Wx and the wind direction variation variable ΔWDx. That is, based on the two variables 210 (in general n variables) it can be determined if the coordinate point is inside or outside the envelope of the curve 301, where the curve or curves are generally defined in the n-dimensional space of the variables 210.

Figure 3B:
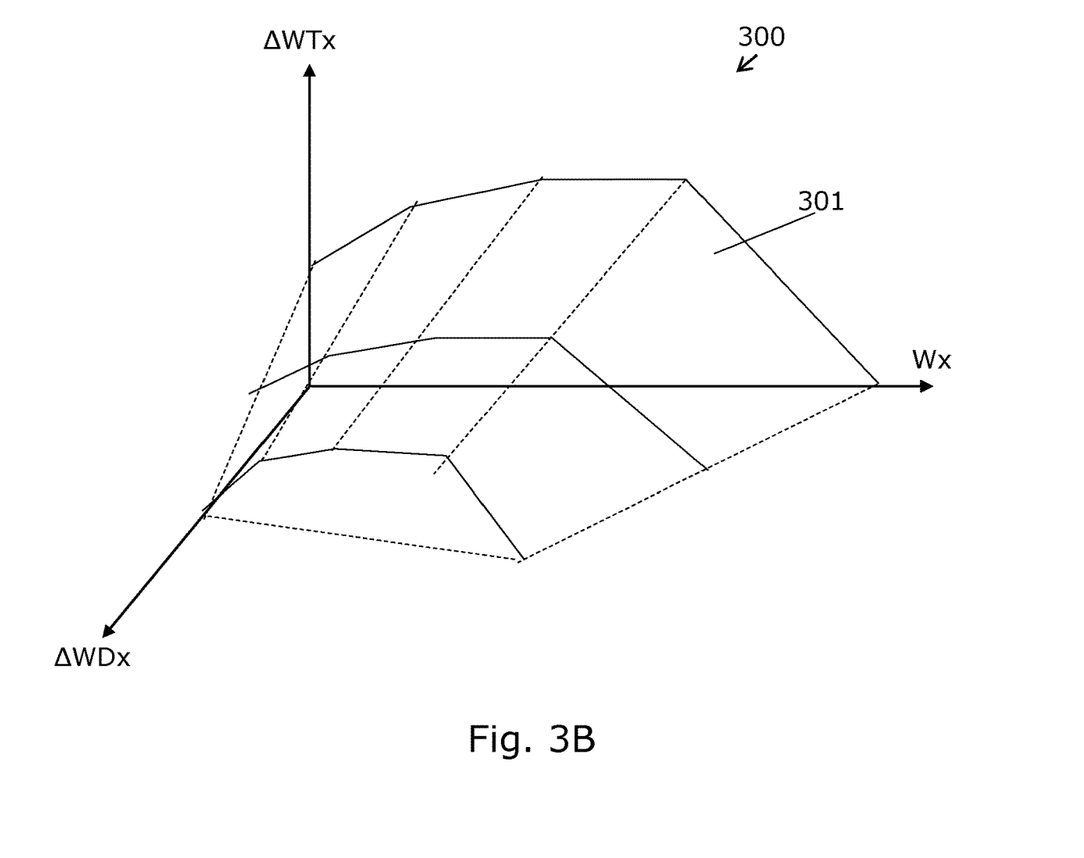

FIG. 3B illustrates an example where the decision function 300 is dependent on three variables: The wind direction variable Wx, the wind direction variation variable ΔWDx and the wind turbulence variation variable ΔWTx. In this case the function is represented by the 3D surface 301.

In these examples, and other configurations of the decision function 300 which is based on curves 301, the activation parameter Px is dependent on where the variables 210 are within the inside space of the function 301 or within the outside space of the function 301. Thus, if the variables 210 are within the outside space of the function 301, the activation parameter Px is determined, e.g. set to zero, so as to disable the yaw offset control.

In other examples, the decision function may be configured as a look-up table or a mathematical function or algorithm which provides the activation parameter Px.

FIG. 3A shows how the yaw offset can be scaled by a weight provided by the decision function. For example, as illustrated the decision function 300 may define different regions 302, 303 within the function 301, or may define two or more functions 301,301a so that the value of the activation parameter Px depends on the magnitude of the variables 210. In this example, Px may be provided by a binary activation signal, and the yaw offset values θ may then be scaled according to the value of the activation parameter Px or other weight values provided by the decision function 300. Although not illustrated in FIG. 3B, the decision function 300 of three or higher dimensions, as well as look-up table and other configurations, may be configured similarly to provide weight values for scaling the yaw offset θ.

The decision function may be determined from simulations of the energy production from the wind turbine park. For different wind directions Wx and wind speeds, the yaw offset θ is given by the yaw offset controller 291, e.g. according to look-up tables as in FIG. 2B. Based on the yaw offset θ for each individual wind turbine, the wind farm energy productions, with the yaw offset control enabled, respectively disabled, for one or more of the plurality of wind turbines, are compared. The comparison is determined for different values of the variables 210, and permutations of enabled and disabled wind turbines, so as to define the boundaries of the decision function 300 with respect to enabling and disabling the yaw offset control and possibly with respect to different scaling weights of the enabled yaw offset θ.

Alternatively, the decision function may be determined based on an optimization function which determines which pattern of enabled and disabled yaw offset control settings that optimizes the energy production of the plurality of wind turbines dependent the variables 210 and the wind speed.

Alternatively or additionally, the decision function may be determined and/or updated based on measurements of the energy production, e.g. based on comparing the actual energy production of the plurality of wind turbines when the yaw offset control is enabled respectively disabled for one or more of the plurality of wind turbines and in different ranges of the variables 210 and the wind speed. For example, during normal operation of the wind park, the pattern of enabled and disabled yaw offset control settings may be permuted in order to search for a possible more advantageous pattern of the enabled and disables yaw offset states of the plurality of wind turbines for the actual values of the variables 210 and the wind speed.

The wind turbine controller unit 200 may be comprised by a wind turbine controller which is associated with each wind turbine 101 and arranged for controlling a specific wind turbine. The wind turbine controller includes the yaw control system 290 and the wind turbine controller unit 200.

Alternatively, the wind turbine controller unit 200 may be comprised by the wind farm controller 110. In this case the wind turbine controller unit 200 is arranged for controlling a plurality of wind turbines, i.e. arranged to provide the activation parameter Px to individual wind turbines or to individual yaw offset controllers 291. In principle the yaw offset controllers 291 may be located de-centrally, e.g. in the wind farm controller. However, advantageously, yaw offset controllers 291 are comprised by individual wind turbines 101. In this case, the wind farm controller 110 is configured with a communication function for sending the activation parameters Ps, e.g. as yaw-offset activation signal, to one or more of the plurality of wind turbines to enable or disable the yaw offset control, individually.

Accordingly, the wind turbine controller unit 200 can be included the wind turbine controller, the wind farm controller 110, or a SCADA system.

The invention claimed is:

1. A method for controlling a yaw offset of a plurality of wind turbines, the method comprises:

providing a decision function arranged for providing an activation parameter for a specific wind turbine of the plurality of wind turbines dependent on two or more variables, where the two or more variables comprise:
  a wind direction variable indicative of the wind direction of the specific wind turbine; and
  a wind variation variable defining at least a wind variation range where yaw offset control is disabled and/or a wind variation range where yaw offset control is enabled,
enabling or disabling the yaw offset control of the specific wind turbine based on the activation parameter, wherein the enabled yaw offset control provides a yaw offset relative to a default yaw setting,
wherein the wind variation variable is determined from most recent measurements obtained in a period of time prior to the enabling or disabling of the yaw offset control.

2. The method of claim 1, wherein the wind variation variable comprises one or both of:
  a wind direction variation variable indicative of a level of variation of a wind direction over time; and
  a wind turbulence variation variable indicative of a level of variation of a wind turbulence.

3. The method of claim 1, wherein the activation parameter provides information defining if the yaw offset control should be disabled and/or enabled.

4. The method of claim 1, wherein the decision function has been determined based on comparing a simulated energy production of the plurality of wind turbines when the yaw offset control is enabled, respectively disabled, for one or more of the plurality of wind turbines.

5. The method of claim 1, wherein the decision function has been determined and/or is updated based on a comparison of an actual energy production of the plurality of wind turbines obtained when the yaw offset control is enabled respectively disabled for one or more of the plurality of wind turbines.

6. The method of claim 1, wherein the yaw offset is scaled according to a weight provided by the decision function or by the activation parameter.

7. The method of claim 1, wherein the variables of the decision function further comprises: a wind shear variable, a nacelle direction variable for the specific wind turbine, a nacelle direction variable for a neighbor wind turbine to the specific wind turbine, and a wind turbulence variable for a neighbor wind turbine to the specific wind turbine.

8. The method of claim 1, comprising:
providing a plurality of decision functions arranged for providing a plurality activation parameters for a plurality of specific wind turbines dependent on the two or more variables.

9. A wind turbine controller unit arranged for controlling a yaw offset of one or more wind turbines, the wind turbine controller unit comprises:
  a decision function arranged for providing an activation parameter for a specific wind turbine of the one or more wind turbines dependent on two or more variables, where the two or more variables comprise:
    a wind direction variable indicative of the wind direction of the specific wind turbine; and
    a wind variation variable defining at least a wind variation range where yaw offset control is disabled and/or a wind variation range where yaw offset control is enabled,
    wherein the activation parameter is provided for enabling or disabling the yaw offset control of the specific wind turbine, where the enabled yaw offset control provides a yaw offset relative to a default yaw setting,
  wherein the variables of the decision function further comprise: a wind shear variable, a nacelle direction variable for the specific wind turbine, a nacelle direction variable for a neighbor wind turbine to the specific wind turbine, and a wind turbulence variable for a neighbor wind turbine to the specific wind turbine.

10. A computer program product comprising software code adapted to control a wind turbine when executed on a data processing system, the computer program product being adapted to perform an operation for controlling a yaw offset of the wind turbine, comprising:
providing a decision function arranged for providing an activation parameter for the wind turbine dependent on two or more variables, where the two or more variables comprise:
  a wind direction variable indicative of the wind direction of the wind turbine; and
  a wind variation variable defining at least a wind variation range where yaw offset control is disabled and/or a wind variation range where yaw offset control is enabled; and
enabling or disabling the yaw offset control of the wind turbine based on the activation parameter, wherein the enabled yaw offset control provides a yaw offset relative to a default yaw setting,
wherein the wind variation variable is determined from a most recent measurements obtained in a period of time prior to the enabling or disabling of the yaw offset control.

11. The computer program product of claim 10, wherein the wind variation variable comprises one or both of:
  a wind direction variation variable indicative of a level of variation of a wind direction over time; and
  a wind turbulence variation variable indicative of a level of variation of a wind turbulence.

12. The computer program product of claim 10, wherein the activation parameter provides information defining if the yaw offset control should be disabled and/or enabled.

13. The computer program product of claim 10, wherein the decision function has been determined based on comparing a simulated energy production of a plurality of wind turbines when the yaw offset control is enabled, respectively disabled, for one or more of the plurality of wind turbines.

14. The computer program product of claim 10, wherein the decision function has been determined and/or is updated based on a comparison of an actual energy production of a plurality of wind turbines obtained when the yaw offset control is enabled respectively disabled for one or more of the plurality of wind turbines.

15. The computer program product of claim 10, wherein the yaw offset is scaled according to a weight provided by the decision function or by the activation parameter.

16. The computer program product of claim 10, wherein the variables of the decision function further comprises: a wind shear variable, a nacelle direction variable for the wind turbine, a nacelle direction variable for a neighbor wind turbine to the wind turbine, and a wind turbulence variable for a neighbor wind turbine to the wind turbine.

17. The computer program product of claim 10, further comprising providing a plurality of decision functions arranged for providing a plurality activation parameters for a plurality of specific wind turbines dependent on the two or more variables.

* * * * *